Nov. 11, 1941.   V. F. ZAHODIAKIN   2,262,418
FASTENING DEVICE
Filed Dec. 2, 1940   2 Sheets-Sheet 1
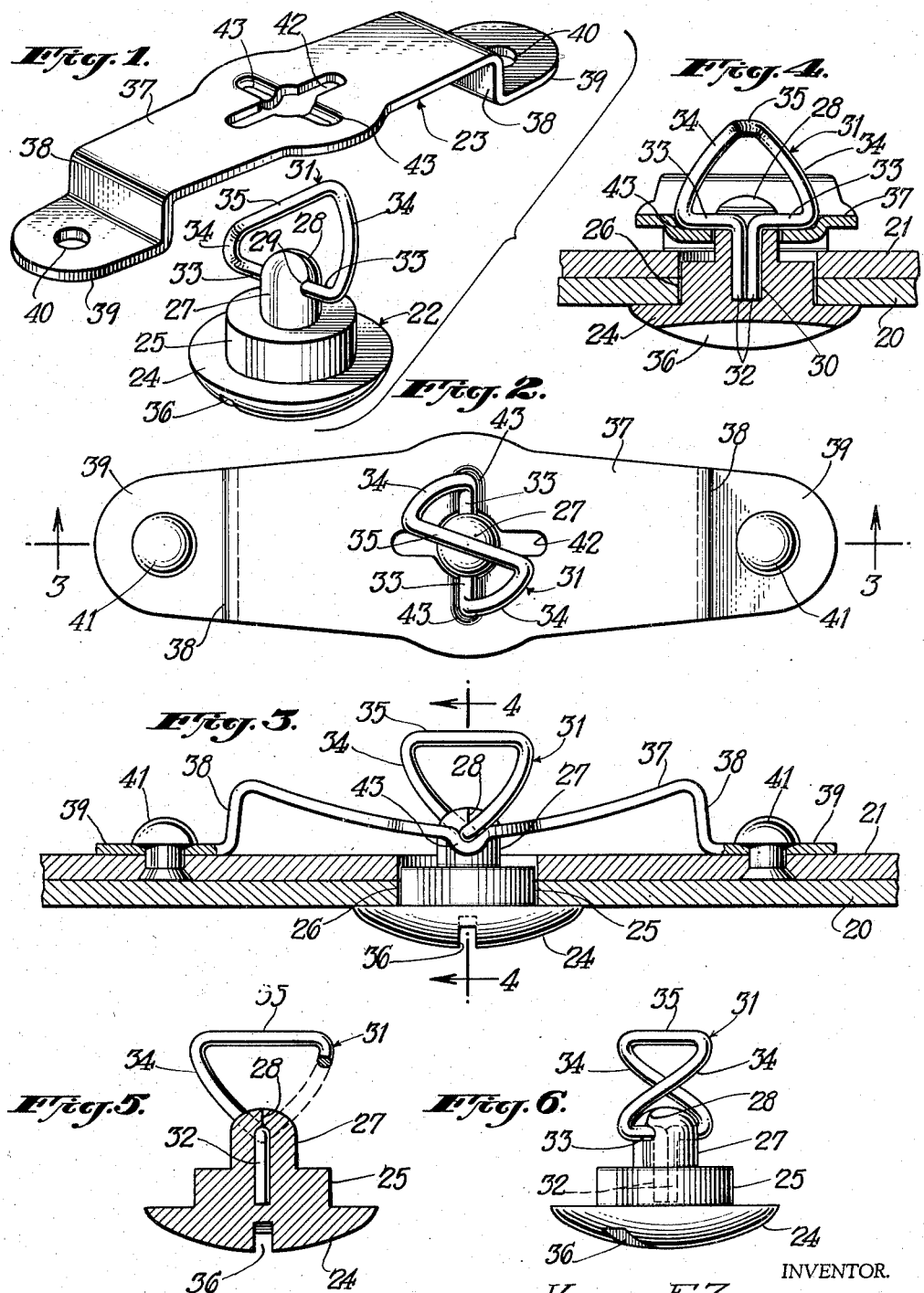
INVENTOR.
VICTOR F. ZAHODIAKIN.
BY George Scalach
ATTORNEY Nov. 11, 1941.  V. F. ZAHODIAKIN  2,262,418
FASTENING DEVICE
Filed Dec. 2, 1940  2 Sheets—Sheet 2
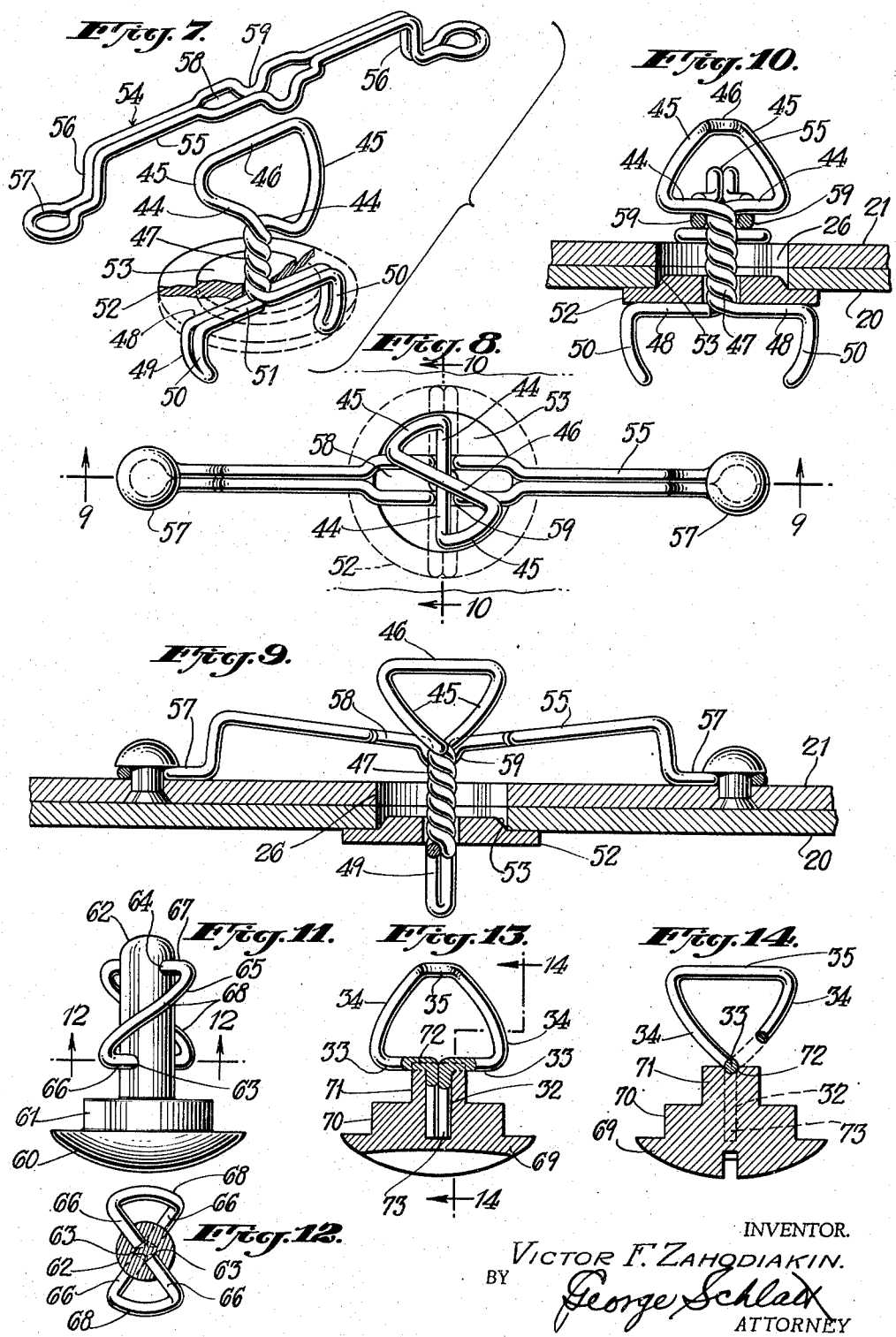
INVENTOR.
VICTOR F. ZAHODIAKIN.
BY George Schlatt
ATTORNEY Patented Nov. 11, 1941

2,262,418

UNITED STATES PATENT OFFICE 2,262,418

FASTENING DEVICE

Victor F. Zahodiakin, Maplewood, N. J.

Application December 2, 1940, Serial No. 368,149

15 Claims. (Cl. 24—221)

This invention relates to improvements in fastening devices, and more particularly to fastening devices for releasable clamping and locking together of a plurality of juxtaposed members.

Objects

Among the principal objects which the present invention has in view are: to provide an improved fastening device having means for securely clamping together a plurality of juxtaposed members; to provide an improved fastening device with one element thereof having means for receiving another element for clamping together a plurality of juxtaposed members; to provide an improved fastening element which will engage a portion of a bridge element under pressure and securely clamp the plurality of juxtaposed members together; to provide a fastening device which requires no machining operations but is susceptible to manufacture by die-stamping and press work; to provide a fastening device which can be made and assembled with metal in relatively soft condition and thereafter hardened; to adapt the fastening element to utilization of wire as the blade portion thereof; to avoid rough or sharp edges on the blade portion of such fastening device; to incorporate the ends of the wire forming the blade within an enclosure from which withdrawal is prevented; to provide a structure utilizing minimum quantity of metal without sacrificing strength, convenience and utility; to provide a structure employing readily manufactured parts; to secure simplicity of construction, installation, minimum cost of manufacture and operation; and to secure other advantages and results as may be brought out in the following description.

Drawings:

Figure 1 is a perspective view of my improved fastening device showing the rotating element as disengaged from its resilient or bridge member;

Figure 2 is a top plan view of the assembled elements;

Figure 3 is a longitudinal sectional view of the clamped plates with the fastening element partially in section and in clamping position with respect to the plates, the sectioning being taken substantially on line 3—3 of Figure 2;

Figure 4 is a transverse sectional view on line 4—4 of Figure 3;

Figure 5 is a sectional view at right angles to the sectional view of Figure 4 showing the rotating element only;

Figure 6 is an elevation of the rotating element;

Figure 7 is a perspective view similar to Figure 1, showing a modified construction of the fastening device;

Figure 8 is a plan view of the assembled elements of Figure 7;

Figure 9 is a longitudinal sectional elevation substantially on line 9—9 of Figure 8;

Figure 10 is a transverse sectional view on line 10—10 of Figure 8;

Figure 11 is an elevation of a further modified construction of the rotating element;

Figure 12 is a horizontal sectional view on line 12—12 of Figure 11;

Figure 13 is a vertical sectional view of a further modified construction of the rotating element; and Figure 14 is a sectional view on line 14—14 of Figure 13.

Description

Referring now more particularly to Figures 1 to 6 inclusive, there is shown a preferred embodiment of the invention of my improved fastening device, and it is used with respect to a plurality of juxtaposed members. By way of illustration, the said juxtaposed members are represented as plates, one of which, for convenience, may be termed the main plate 20, such as a part of a body member in the construction of aeroplanes, automobiles, buildings and so forth and the other member 21, a complementary plate such as a cover plate or other part which in use is desired to be securely held flatwise upon and secured to the main plate 20. It is to be understood that although only two such juxtaposed members or plates are shown, any number may be employed and securely clamped together in accordance with the invention herein disclosed.

The fastening device comprises essentially two co-engaging fastening elements, of which one is herein designated a rotating element 22 and the other is designated a resilient bridge or spring element 23. These elements are separable one from the other for separating the members, and are to be assembled in co-engaging relationship after the members are assembled and for purposes of retaining those members in engaging and juxtaposed position. Said rotating element is in the nature of a stud with a helical blade suitably shouldered for locking purposes, and the resilient element is in the nature of a bridge having an opening for receiving the said helical blade and likewise suitably shouldered or socketed for engagement and retention of the shoulders of the rotating element with the parts assembled.

Said rotating element is illustrated as provided with an enlarged head 24 from which projects in a co-axial location a neck portion 25 which is preferably cylindrical and adapted to enter a correspondingly shaped hole 26 provided in the juxtaposed members to be clamped. Said head 24 is larger than hole 26 and when the parts are assembled will engage flatwise against the plate member for limiting inward movement of the rotating element with respect to the plate members. Likewise co-axial with the head 24 and its neck portion 25, is a stem portion 27 projecting upwardly from the said neck. The stem portion 27 is shown bifurcated from its top downwardly as at 28 with the lower end of the bifurcation enlarged to provide a transverse hole 29 diametric through the said stem portion 27. Transverse to said diametric hole midway of the length thereof and axially longitudinally disposed with respect to the stem and neck, is a central socket 30. The said socket 30 and transverse hole 29 are for purposes of mounting a wire blade 31 as a fixed part with respect to said head, neck and stem.

Said blade is preferably constructed from a single piece of wire, the end portions 32 of which are situated parallel and adjacent to each other and enclosed within socket 30 above mentioned. These end portions 32 of the wire are long enough to substantially fill the socket from end to end and bend outwardly away from each other where the socket meets the transverse hole so that the portions of the wire are carried in and project from opposite ends of said hole thereby forming transverse shoulder portions 33, 33. At a distance from the stem said shoulder portions 33, 33 of the wire bend upwardly forming side portions 34, 34 of the blade and join at the top with a horizontally disposed top portion 35.

Preferably during fabrication of this rotatable member just described, the wire portion thereof is, for convenience, manufactured with all of the parts in a common plane. The metal is preferably an untempered carbon steel. Likewise, the stem with which the wire is assembled is of relatively soft metal, for instance untempered carbon steel, and the bifurcation thereof permits the stem to be spread sufficiently for introduction of the end portions and shoulders of the wire element into place. Thereafter the stem is squeezed together so the hole is reduced to snugly fit the shoulder portions of the wire, and then the wire is twisted a partial revolution thereby oppositely curving the side portions 34, 34 thereof in the form of a steep helix so that in plan the top portion 35 of the blade is situated transversely with respect to the shoulder portions 33, 33. With the parts thus assembled and formed, the same are preferably tempered or otherwise treated for preventing spreading of the bifurcation, disassembly of the parts and distortion of the wire element in use. The resultant assembly of the blades in the stem accordingly is a rigid structure whereby rotation of either of the fabricated parts making up the structure will of necessity rotate the other part. A suitable formation for tool engagement with the head may be provided, and by way of example, the said head 24 is shown provided with a saw-slot 36 as an acceptable mechanical expedient for reception of a screw driver as the particular operating tool.

The co-engaging fastening element specifically identified above as a resilient element or spring bridge 23, is preferably a stamping of spring metal having a bendable resilient mid-portion 37 with offset legs 38 at the ends thereof and outwardly directed foot portions 39 therebeyond enabling the foot portions to be riveted, as through apertures 40 therein, to one of the aforesaid juxtaposed members, for instance member 21, by suitable fastening means such as rivets 41. The construction thus described situates the mid-portion 37 of the resilient element or bridge in parallel spaced relationship from the said plate member, and the assembly is made in such manner that the center of this spaced mid-portion 37 of the bridge is directly over the hole 26 of said member. Said mid-portion 37 of the resilient element is apertured at its center in appropriate manner and location to receive the blade of the rotating element and permit said blade to pass upwardly therethrough with a simultaneous rotation of said blade due to its helical formation. As here shown, the said resilient bridge element is slotted longitudinally, as at 42 for the purpose just mentioned. The slot is a length equal to or slightly greater than the span of the widest portions of the blade, and has a width substantially equal to or slightly greater than the thickness or diameter of the wire.

At approximately midway of the length of the slot or opening 42 and extending transversely outwardly from the inner walls thereof, the material of the bridge is depressed downwardly slightly to provide recesses or depressed shoulders 43, 43 of a width substantially that of the diameter of the wire forming shoulders 33, 33 of the blade. These recesses or shoulders 43, 43 of the bridge preferably terminate adjacent the outer edges of the bridge and are of a length commensurate to the lengths of the wire shoulders. In passing it is to be noted the side walls of the recesses preferably are rounded slightly to insure easy reception of the wire shoulders when sliding the same therein for locking or clamping together the juxtaposed plate members.

In the modification illustrated in Figures 7 to 10, the rotating element is illustrated as more entirely of wire formation. The blade portion of the wire is bent as before, with outwardly directed shoulder portions 44, 44 situated in a diametric direction and which bend upwardly at their outer ends forming side portions 45, 45, in turn joined at their upper ends with a horizontally disposed top portion 46. The side portions 45, 45 are twisted in the form of a steep helix, so that as before, in top plan horizontal portion 46 of the blade is situated transversely with respect to the shoulder portions 44, 44. After all formation of the wire has been completed, it is preferably hardened or tempered in any suitable manner.

Part of the forming operation of the instant rotating element includes twisting the two strands of wire next the inner ends of transverse or shoulder portions 44, 44 into a tightly coiled stem 47, at the lower end of which strands again project diametrically outward as at 48, 48 and then downward as at 49, 49, to form a tool engaging portion for the rotating element. The wire may be reversely bent to return as at 50 and 51 adjacent to the respective portions 49 and 48 so as to afford additional strength and to locate the end of the wire next the bottom of the stem where it will be most protected. During the formation of the said element a washer-like head 52 is applied on the stem 47 immediately above outwardly bent portions 48, 48 of the wire. This head preferably has a reduced neck 53 to fit within the hole 26 of plates 20 and 21. The hardening or tempering of the element is preferably done after the washer-like head is assembled and all bending of the wire portion is completed.

These several figures now being described also preferably provide a bridge or resilient element 54 in this instance shown fabricated of resilient spring wire, providing an offset middle portion 55, offsetting or leg portions 56 and outwardly extending foot portions 57 similarly to the preceding showing. The fabrication of wire enables the longitudinal slot 58 to be formed by appropriate separation of the strands of the wire and depressions 59 for seating the blade shoulders are formed by downward deflection of those strands midway of the length of the slot.

It is to be understood that further modifications of the rotary element may be made wherein the blade portion thereof is fabricated from wire. For instance, in Figures 11 and 12, the element includes a head 60 having a neck 61 from which projects a stem 62 considerably longer than the stem 27 of the first described construction. In a lower part of this stem are provided radially constructed sockets 63 which are preferably aligned but do not meet at the midportion of the stem. A similar pair of sockets 64 are provided near the upper end of the stem, but in a direction transverse to the lower sockets. Individual Z-shaped blade portions of wire 65 are provided with the lower portions thereof forming shoulders 66 and the upper portions 67 forming the top portion of the blade. The intervening side portion 68 is shaped in the form of a steep helix, and these parts being duplicated on opposite sides of the stem, constitute a blade similar in contour to the blades of the previously described constructions. After the blade portions are inserted in the several holes, assembly is made permanent by welding or other suitable operation.

If it is desired to avoid the spreading of a bifurcated stem, the said stem can be made similar to the showing of Figures 1 to 6 except that the transverse opening for the wire shoulders is made as a depression at the extreme end of the stem. This modification is illustrated in Figures 13 and 14 and inasmuch as the wire blade portion is identical in construction as in the showing of Figures 1 to 6, the same reference numerals are applied thereto. The head 69 of this modified rotary element has a neck 70 and a stem 71. As indicated above, the further end of this stem is provided with a transverse hollow 72, which crosses the longitudinal central socket 73. The end portions 32 are inserted in the socket with the transverse shoulders 33 seating in the said hollow 72. With the parts thus assembled, the wire may be welded or otherwise secured in place, and tempering of the entire element preferably follows twisting of the wire into a steep helix at its side portions 34, 34 and assembly and welding of the wire portion with the head portion of the element.

Obviously detail changes and modifications may be made in the construction and operation of my improved fastening devices without departing from the spirit and scope of the invention, and I do not wish to be understood as limiting myself to the exact construction or operation shown or described.

I claim:

1. A fastening device comprising co-engaging elements, one of said elements being resilient and slotted, the other said element being rotatable and having a helical wire blade with the wire of said blade also forming a transverse shoulder for engagement with the resilient element after passing through the slot thereof.

2. A fastening device comprising co-engaging elements, one of said elements being resilient and slotted, the other said element being rotatable and having a helical wire blade with the wire of said blade having opposite portions formed as helixes and having a part of the wire connecting the upper ends of the helical portions, and said wire at the bottom of said helical portions also forming a transverse shoulder for engagement with the resilient element after passing through the slot thereof.

3. A fastening device comprising a rotatable element comprising a tool-engaging portion and a blade portion, said blade portion comprising a single piece of wire bent to provide sides each formed as a steep helix, and said wire bent at the bottom of each helix to extend inward toward the middle of the blade for forming a lower shoulder to the blade.

4. A fastening device comprising a rotatable element comprising a tool-engaging portion and a blade portion, said blade portion comprising a single piece of wire bent to provide sides each formed as a steep helix, and said wire bent at the bottom of each helix to extend inward toward the middle of the blade for forming a lower shoulder to the blade, the inwardly directed parts of the wire forming the shoulders having immovable relation with respect to the tool-engaging portion.

5. A fastening device comprising a rotatable element comprising a tool-engaging portion and a blade portion, said blade portion comprising a single piece of wire bent to provide sides each formed as a steep helix, said wire bent at the bottom of each helix to extend inward toward the middle of the blade for forming a lower shoulder to the blade, the inwardly directed parts of the wire forming the shoulder having the inner ends thereof turned downwardly side by side and fast with respect to the tool-engaging portion.

6. A fastening device comprising a rotatable element comprising a tool-engaging portion and a blade portion, said blade portion comprising a single piece of wire bent to provide sides each formed as a steep helix, and said wire bent at the bottom of each helix to extend inward toward the middle of the blade for forming a lower shoulder to the blade, said tool-engaging portion having a socket therein, and the inwardly directed parts of the wire forming the shoulder having the inner ends thereof turned downwardly side by side and situated in said socket.

7. A fastening device comprising a rotatable element comprising a tool-engaging portion and a blade portion, said blade portion comprising a single piece of wire bent to provide sides each formed as a steep helix, and said wire bent at the bottom of each helix to extend inward toward the middle of the blade for forming a lower shoulder to the blade, said tool-engaging portion having a transverse cavity and a longitudinal socket leading from a mid-part of said cavity, said shoulder portions of the wire being in part seated in said cavity, and the inner ends of the wire forming said shoulders being bent to enter said longitudinal socket.

8. A fastening device comprising a rotatable element comprising a tool-engaging portion and a blade portion, said blade portion comprising a single piece of wire bent to provide sides each formed as a steep helix, and said wire bent at the bottom of each helix to extend inward toward the middle of the blade for forming a lower shoulder to the blade, said tool-engaging portion having a socket therein, and the inwardly directed parts of the wire forming the shoulder having the inner ends thereof turned downwardly side by side and situated in said socket, and means holding said shoulders assembled with respect to the tool-engaging portion.

9. A fastening device comprising a rotatable element comprising a tool-engaging portion and a blade portion, said blade portion comprising a single piece of wire bent to provide sides each formed as a steep helix, and said wire bent at the bottom of each helix to extend inward toward the middle of the blade for forming a lower shoulder to the blade, said tool-engaging portion having a transverse cavity and a longitudinal socket leading from a mid-part of said cavity, said shoulder portions of the wire being in part seated in said cavity, and the inner ends of the wire forming said shoulders being bent to enter said longitudinal socket, and means holding said shoulders assembled with respect to the tool-engaging portion.

10. A fastening device comprising a rotatable element comprising a tool-engaging portion and a blade portion, said blade portion comprising a single piece of wire bent to provide sides and to provide inwardly directed portions forming shoulders, said tool-engaging portion having a stem with a transverse cavity, and said shoulder portions of the wire seated and retained in said cavity.

11. A fastening device comprising a rotatable element comprising a tool-engaging portion and a blade portion, said blade portion comprising a single piece of wire bent to provide sides and to provide inwardly directed portions forming shoulders, said tool-engaging portion having a stem with bifurcated end and cavity crosswise of the stem in the plane of the cavity, said shoulder portion being carried in said cavity and the bifurcated end of the stem being squeezed together for retaining the said shouldered portions assembled with respect thereto.

12. A fastening device of the class described for securing a plurality of members in juxtaposition comprising co-engaging elements; one of said elements being resilient and slotted; the other said element being rotatable and providing an enlarged head, a neck portion co-axial therewith and a stem portion projecting upwardly therefrom; said stem portion being provided with a transverse hole and a central socket extending downwardly in said stem, neck and head; said rotatable element having a helical wire blade extending upwardly with its ends in parallel relationship from the socket and bent outwardly from the said hole thereby forming shoulder portions; said shoulder portions extending upwardly to provide helixes; said helixes being bent inwardly towards each other at the top to provide a horizontally disposed top portion; and said helical blade adapted to pass through the slot of the resilient element with the said shoulders firmly engaging the resilient element in a transverse direction for securely locking together the juxtaposed members.

13. A fastening device of the class described for securing a plurality of members in juxtaposition comprising co-engaging elements; one of said elements being resilient and slotted; the other said element being rotatable and providing an enlarged head, a neck portion co-axial therewith and a stem portion projecting upwardly therefrom; said stem portion being provided with a transverse hole and a central socket extending downwardly in said stem, neck and head; said rotatable element having a helical wire blade extending upwardly with its ends in parallel relationship from the socket and bent outwardly from the said hole thereby forming a plurality of transverse shoulder portions; said transverse shoulder portions extending upwardly to provide a plurality of helixes; said helixes being bent inwardly towards each other at the top to provide a horizontally disposed top portion; and said helical blade adapted to pass through the slot of the resilient element with the said shoulders firmly engaging the resilient element in a transverse direction for securely locking together the juxtaposed members.

14. A fastening device of the class described for securing a plurality of members in juxtaposition comprising co-engaging elements; one of said elements being resilient and slotted; the other said element being rotatable and providing an enlarged head, a neck portion co-axial therewith and a stem portion projecting upwardly therefrom; said stem portion being provided with a transverse hole and a central socket extending downwardly in said stem, neck and head; said rotatable element having a helical wire blade extending upwardly with its ends in parallel relationship from the socket and bent outwardly from the said hole thereby forming oppositely directed shoulder portions; said shoulder portions being twisted a partial revolution to provide upwardly extending helixes; said helixes being bent inwardly towards each other at the top to provide a horizontally disposed top portion; and said helical blade adapted to pass through the slot of the resilient element with the said shoulders firmly engaging the resilient element in a transverse direction for securely locking together the juxtaposed members.

15. A fastening device of the class described for securing a plurality of members in juxtaposition comprising co-engaging elements; one of said elements being resilient and slotted; the other said element being rotatable and providing an enlarged head, a neck portion co-axial therewith and a stem portion projecting upwardly therefrom; said stem portion being bifurcated and provided with a transverse hole; a central socket extending downwardly in said stem, neck and head; said rotatable element having a helical wire blade extending upwardly with its ends in parallel relationship from the socket and bent outwardly from the said hole thereby forming oppositely directed shoulder portions; said shoulder portions being twisted a partial revolution to provide upwardly extending helixes; said helixes being bent inwardly towards each other at the top to provide a horizontally disposed top portion; and said helical blade adapted to pass through the slot of the resilient element with the said shoulders firmly engaging the resilient element in a transverse direction for securely locking together the juxtaposed members.

VICTOR F. ZAHODIAKIN.